United States Patent
Wood et al.

(10) Patent No.: US 7,792,097 B1
(45) Date of Patent: Sep. 7, 2010

(54) STATIC, DYNAMIC AND INTELLIGENT VRF ROUTING FOR SERVICES TRAFFIC

(75) Inventors: Michael J. Wood, Monte Sereno, CA (US); Sibrina Shafique, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 323 days.

(21) Appl. No.: 11/552,909

(22) Filed: Oct. 25, 2006

(51) Int. Cl.
*H04L 12/66* (2006.01)

(52) U.S. Cl. ..................................... 370/352
(58) Field of Classification Search ................. 370/392, 370/352
See application file for complete search history.

(56) References Cited

U.S. PATENT DOCUMENTS 5,274,641 A * 12/1993 Shobatake et al. .......... 370/392
6,614,781 B1 * 9/2003 Elliott et al. ................ 370/352
7,082,133 B1 * 7/2006 Lor et al. .................... 370/392
2005/0120089 A1 * 6/2005 Kang et al. ................. 709/213
2006/0168316 A1 * 7/2006 Kabashima et al. ......... 709/238
2006/0176840 A1 * 8/2006 Bloch et al. ................ 370/315

OTHER PUBLICATIONS

Cisco Systems, Inc., MPLS VPN—VRF Selection Using Policy Based Routing, Cisco IOS Release 12.3 (7)T and 12.2 (25)S, Copyright © 2300 Cisco Systems, All rights reserved. (19 pages), publication date: Mar. 2004.
Cisco Systems, Inc., MPLS VPN—VRF Selection Based On Source IP Address, Cisco IOS Release 12.0 (22)S, (18 pages), publication date: Feb. 2003.

* cited by examiner

*Primary Examiner*—Ayaz R Sheikh
*Assistant Examiner*—Hai-Chang Hsiung
(74) *Attorney, Agent, or Firm*—Stolowitz Ford Cowger LLP

(57) ABSTRACT

A system for determining static, dynamic and intelligent Virtual Route Forwarding routing for services traffic includes a data device and a network processing device. The network processing device is configured to: receive a data transmission from the data device, analyze the data transmission to identify a data characteristic other than a source or destination associated with the data transmission, create a packet, determine a transmission identifier associated with the data characteristic, and transmit the packet through a network path corresponding to the transmission identifier.

17 Claims, 5 Drawing Sheets

STATIC, DYNAMIC AND INTELLIGENT VRF ROUTING FOR SERVICES TRAFFIC

BACKGROUND

The invention relates to an apparatus, system and method to implement multiple virtual route forwarding virtual networks for any combination of voice, video or data services.

A network may include one or more routers to facilitate transmission of packets. Routers may be used to transmit, or route, a packet through intermediate networks to a destination network. Routing may be performed in the same network. In conventional networks, data packets may be identified according to an ingress interface of a router that they arrive on. The physical, ingress interface determines a virtual network identification of the data packet. The physical and virtual interfaces to a router are assigned to different virtual networks and therefore reside in their individual virtual routing tables. The router then associates a routing path or destination based on the virtual network the packet belongs to and makes a selection of an associated routing table to route the packet to its destination. Selection of the routing table according to its virtual network identification is referred to as Virtual Route Forwarding (VRF).

In conventional systems, data is originated by endpoints like computers or application servers. The router routes this data traffic based on a routing table identified by the ingress interface. In some cases devices such as phones, fax machines, and analog and digital (non-IP) interfaces to a Private Branch Exchange (PBX) or a Public Switched Telephone Network (PSTN) are connected to the router, in which case the Internet Protocol (IP) packet originates within the router. In other cases, a data packet that arrives at the router may be depacketized and then repacketized, such that the data packet leaving the router appears to have originated within the router. The router relies on a global routing table to route different types of data traffic associated with different services. The router is unable to provide VRF selection ability for data that originates within the router.

The invention will become more readily apparent from the following detailed description of a preferred embodiment of the invention which proceeds with reference to the accompanying drawings.

DESCRIPTION OF EXAMPLE EMBODIMENTS

Overview

A system for determining static, dynamic and intelligent Virtual Route Forwarding routing for services traffic including a data device and a network processing device is herein disclosed. The network processing device is configured to receive a data transmission from the data device, analyze the data transmission to identify a data characteristic other than a source or destination associated with the data transmission, create a packet, determine a transmission identifier associated with the data characteristic, and transmit the packet through a network path corresponding to the transmission identifier.

A method for determining static, dynamic and intelligent Virtual Route Forwarding routing for services traffic is herein disclosed. The method includes receiving data, analyzing the data to determine a signaling characteristic, determining a voice interface associated with the data characteristic and transmitting the data on the voice interface.

Figure 1:
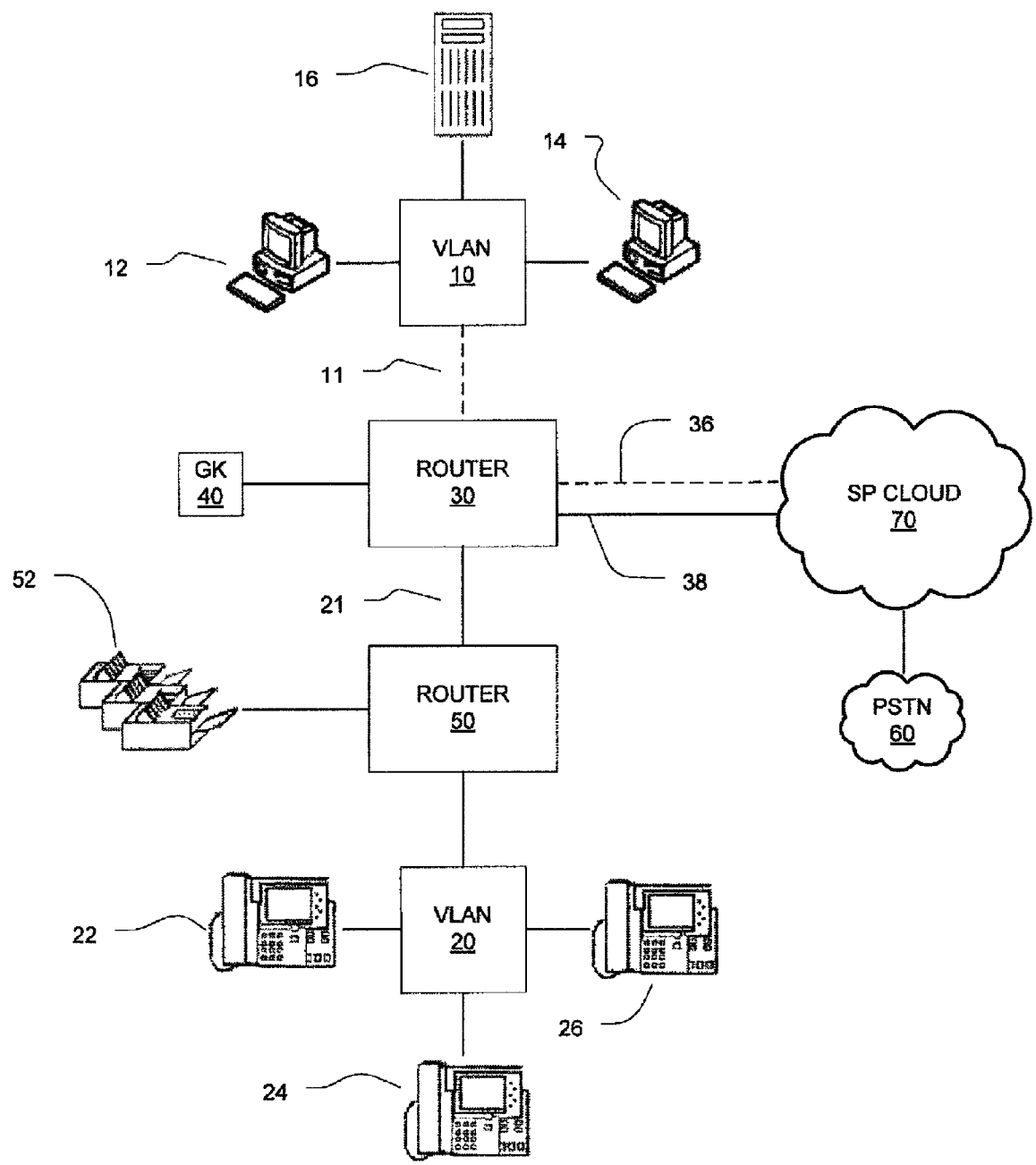
FIG. 1 illustrates an example block diagram of a networked system capable of Virtual Route Forwarding (VRF).

FIG. 1 illustrates a networked system that is capable of routing data packets. Router 30 is shown connected to a first VLAN 10, a second VLAN 20, Service Provider (SP) cloud 70. Router 30 may support multiple virtual networks. Interfaces associated with VLAN 10 and VLAN 20 are in different virtual routing tables. A second router 50 functions as a voice gateway and has interfaces that connect to the Public Switched Telephone Network (PSTN) 60. The PSTN 60 may also be referred to as a Plain Old Telephone Systems (POTS). The stream from PSTN 60 is converted to IP packets by the Router 50. Router 50 routes these packets according to the global routing table. The packets are sent to Router 30 through VLAN 20 to be routed using a virtual routing table.

VLAN 10 is shown as connecting a first workstation 12, a second workstation 14, and a server 16. Workstations 12 and 14, shown as personal computers, can communicate with each other and with the server 16 located within the VLAN 10. They are a part of the same virtual network or community.

VLAN 20 is shown as connecting a first digital telephone 22, a second digital telephone 24 and a third digital telephone 26. Digital telephones 22, 24 and 26 are able to communicate with each other through VLAN 20. They are part of the same virtual network or community, separate from VLAN 10.

Since the interfaces associated with VLAN 10 and VLAN 20 are placed in different virtual routing tables on the router 30, the two networks VLAN 10 and VLAN 20 are isolated and do not communicate with one another.

Router 30 receives packets from VLAN 10 on interface 11 and receives packets from VLAN 20 on interface 21. Based on the incoming interface Router 30 identifies which routing table to refer in order to route the packets to the next hop.

A fax machine 52 is shown connected to router 50. The fax machine 52 sends analog data or a data stream that does not include any virtual network identification. Data received on router 50 is forwarded according to a global routing table, which simply routes the data from the fax machine 52 to a predetermined destination or route.

The SP cloud 70 is connected to the PSTN 60 which provides analog connections too other telephones outside of the networked system. Voice data from VLAN 20 may be transmitted on routing path 38, through the SP cloud and to the PSTN 60. Similarly, fax messages sent by the fax machine 52 may be transmitted to the PSTN 60 through the SP cloud 70.

Figure 2:
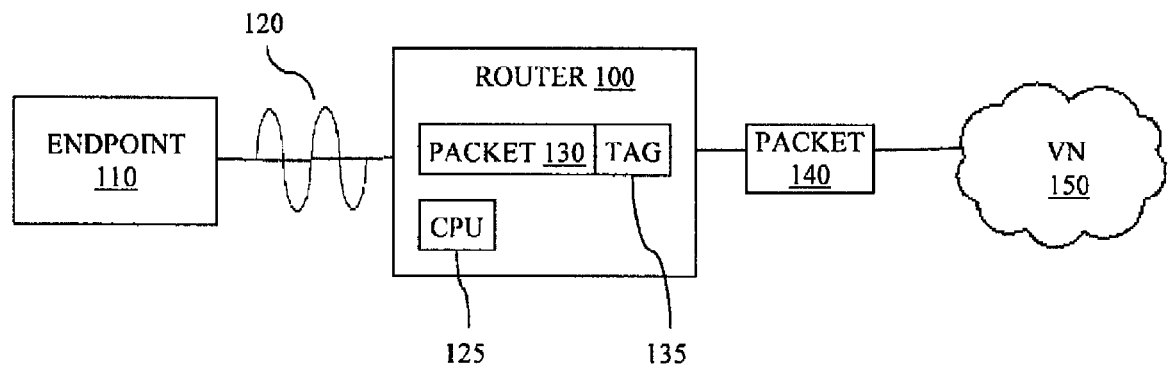
FIG. 2 illustrates an example block diagram of a router that is adapted to VRF route data through a networked system.

FIG. 2 illustrates an example block diagram of a router 100 that is adapted to route data 120. The data 120 is transmitted by an endpoint 110 through Virtual Network 150. The data 120 may be analog data or a digital Pulse Code Modulation (PCM) that does not include virtual network identification. For example, the endpoint 110 could be a device, such as the fax machine 52 in FIG. 1. Conventional routers, such as router 50 in FIG. 1, would route the data 120 according to a global routing table. However, the router 100 of FIG. 2 includes a processor 125 or central processing unit (CPU), which is able to process the data 120, such as voice data, according to a data characteristic, or signaling characteristic. Processor 125 identifies a data characteristic of the data 120 and creates a packet 130 including a virtual identification tag 135. In one embodiment, the data characteristic may include an originating data port, an E.164 address, or a type of data service, for example voice data. The E.164 protocol is understood as being defined by the International Telecommunications Union Telecommunication Sector (ITU-T) version 3.

A coder/decoder device (Codec) may be included in the processor 125 or may be a separate processor in the router 100. Analog data received by the router 100 may be sampled by the Codec and translated into a digital signal before being formatted into the data packet 130.

In one embodiment, the tag 135 has only local significance, meaning its not sent out of the router and is associated with the data characteristic used by the processor 125 to determine the VRF route selection based on the virtual route table. The tag 135 may be removed or translated into an outgoing packet layer or layer 3 header, for example a Multi-Protocol Label Switching (MPLS label) or VLAN identification, before the router 100 transmits data packet 140. Other than tag 135, data packet 140 may be identical to data packet 130. Data packet 140, therefore, originates within the router 100. The VRF selection process may include transmission of the data packet 140 to a VRF, Virtual Private Network (VPN), Dynamic Multipoint VPN (DMVPN) or MPLS virtual network, for example. In this way, routing of the data packet 140 may be accomplished independent of the global routing table.

The identification and analysis of the data characteristic may be performed statically or dynamically. A static analysis may associate the tag 135 with all data traffic from a particular service. The service may include, for example: voice, video, voicemail, interactive voice response, voice extensible markup language, Internet packet to Internet packet gateway, or contact center information.

A dynamic analysis may determine the tag 135 based on one or more packet or service characteristics. The characteristics may include, for example: a class of service, a type of service, a differentiated service code point, a source address, a destination address, a traffic type, a source voice port, a calling number, or a called number. The characteristics may further include: a calling Internet Protocol address, a called Internet Protocol address, a calling Uniform Resource Locator, a called Uniform Resource Locator, a call agent, or a communication protocol. The communication protocol may include, for example: a Session Initiation Protocol gateway, a Session Initiation Protocol Survivable Remote Site Telephony gateway, a Multiple Gateway Control Point gateway, an H.323 gateway, an Internet Packet to Internet Packet gateway or Time Division Multiplexing.

Figure 3:
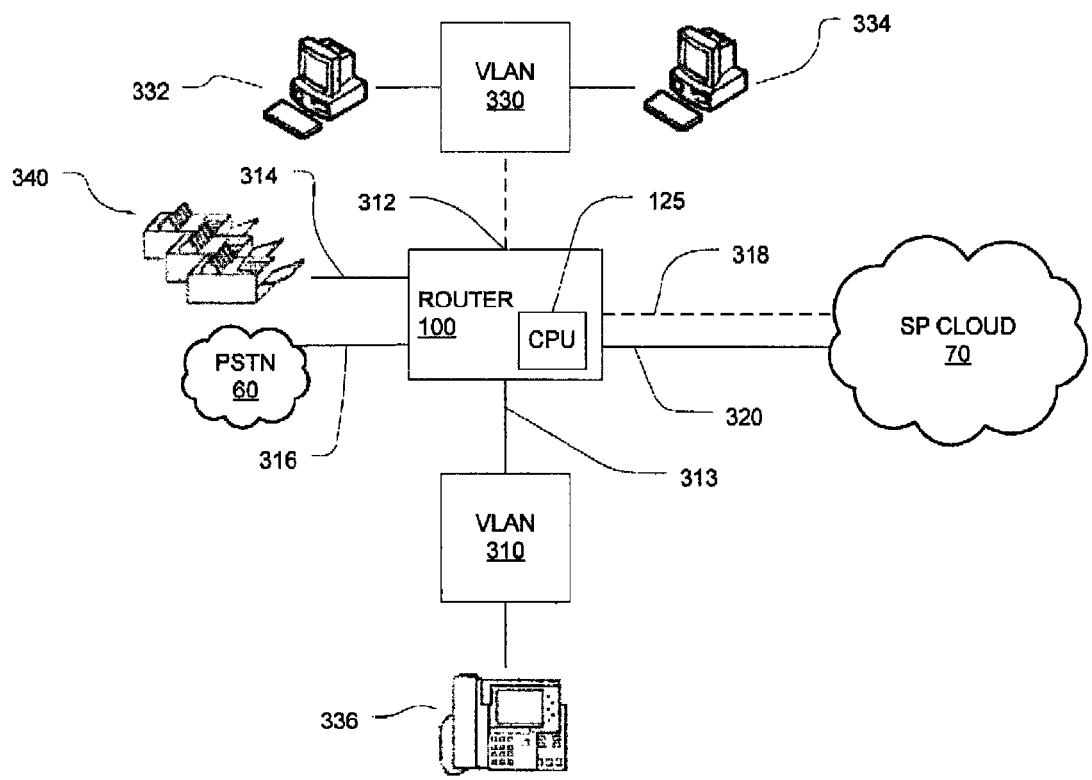
FIG. 3 illustrates an example block diagram of a networked system including the router of FIG. 2.

FIG. 3 illustrates an example block diagram of a networked system including the router 100 of FIG. 2. In this embodiment, the router 100 is shown connected to VLAN 310, VLAN 330, a fax machine 340, the PSTN 60, and the SP cloud 70. VLAN 310 may be connected to router 100 through a virtual or physical interface associated with a Unified Communications Virtual Network (UC VN). VLAN 330 may be connected to router 100 through a virtual or physical interface associated with a data Virtual Network (data VN). Router 100 is shown including the processor 125, and this may be understood to packetize and route data received from the fax machine 340 or the PSTN 60 in a similar manner as described with reference to FIG. 2. In this manner, the packets, including voice packets, that include data transmitted from the fax machine 340 or the PSTN 60, are originated in the router 100 and are routed based on the appropriate virtual routing table, for example the UC VN. More than one voice port may connect the PSTN 60 to the router 100. Unified communications call routing applications and resources such as a conference bridge or a modem on hold server hosted within the router are also associated either dynamically or statically to the UC VN.

The endpoints shown connected to the VLAN 330 include a workstation 332 and a workstation 334. An Internet Protocol (IP) phone 336 is connected to VLAN 310 and may be used to generate voice video packets. The router 100 is able to identify that the workstations 332, 334 are in a different virtual network than the IP phone 336 because the packets originated by the two workstations 332, 334 enter the router 100 from a different virtual or physical interface as the IP phone 336. VLAN 330 is shown connected to the router 100 by interface 312, whereas VLAN 310 is shown connected to the router 100 by interface 313.

All data packets that are generated from any one of the endpoints 332-336 of VLAN 330 could be routed specifically to one of the Virtual Networks (VN) 318 or 320 based exclusively on the virtual network identification included in the data packet. Data packets that are received through an interface 312 or interface 313 could also be VRF routed to a specific VN associated with the interface 312 or 313.

After analyzing and packetizing the data received from the fax machine 340 or the PSTN 60, the router 100 may determine the VRF route for the data packet according to the identification tag 135 generated by the processor 125. For example, the data packet may be routed through a voice VN, such as VN 320. The router 100 and processor 125 may also be configured to route data received from the fax machine 340 or the PSTN 60 according to the interface 314 or interface 316, respectively, that the data is received on.

Voice traffic may be transmitted to the router 100 from the IP phone 336, fax machine 340 and PSTN 60 This voice data may come in on virtual or a physical interfaces 313, 314 and 316 associated with one or more virtual routing tables. Voice traffic is transmitted over the Unified Communication Virtual Network (UC VN). Data endpoints that are attached to the router 100 through a separate physical or virtual interface (such as interfaces 312) are associated with the data VN. In general any endpoint needing access to the voice, video and other UC VN resources are placed in the UC VN. Endpoints needing access to the data VN resources may be placed in the data VN. In this manner endpoints in the UC VN may be isolated from data applications in the data VN, and similarly, endpoints in the data VN may be isolated from voice applications in the UC VN.

Router 100 may include a WAN interface such as a MPLS interface with provides for MPLS label forwarding. MPLS label forwarding is performed with a label lookup for an incoming label of a data packet, which is then swapped with the outgoing label before the data packet is sent to the next hop. Labels are provided at one end of the MPLS network and removed at the other end. These labels are typically assigned to packets based on a classification. Packets belonging to the same classification may be forwarded similarly. The label may be added between a Layer 2 and Layer 3 header or in a virtual path identifier field, for example. The network is able to reads the label, and forward the packets based on the label. MPLS forwarding may be determined according to the destination and source addresses.

In one embodiment, the MPLS labels are determined at the router 100, such that the MPLS address is associated with the tag 135. The router 100 is able to analyze data received from multiple VLANs and other data sources in order to VN the data through a MPLS or WAN environment in conjunction with the MPLS forwarding services.

Figure 4:
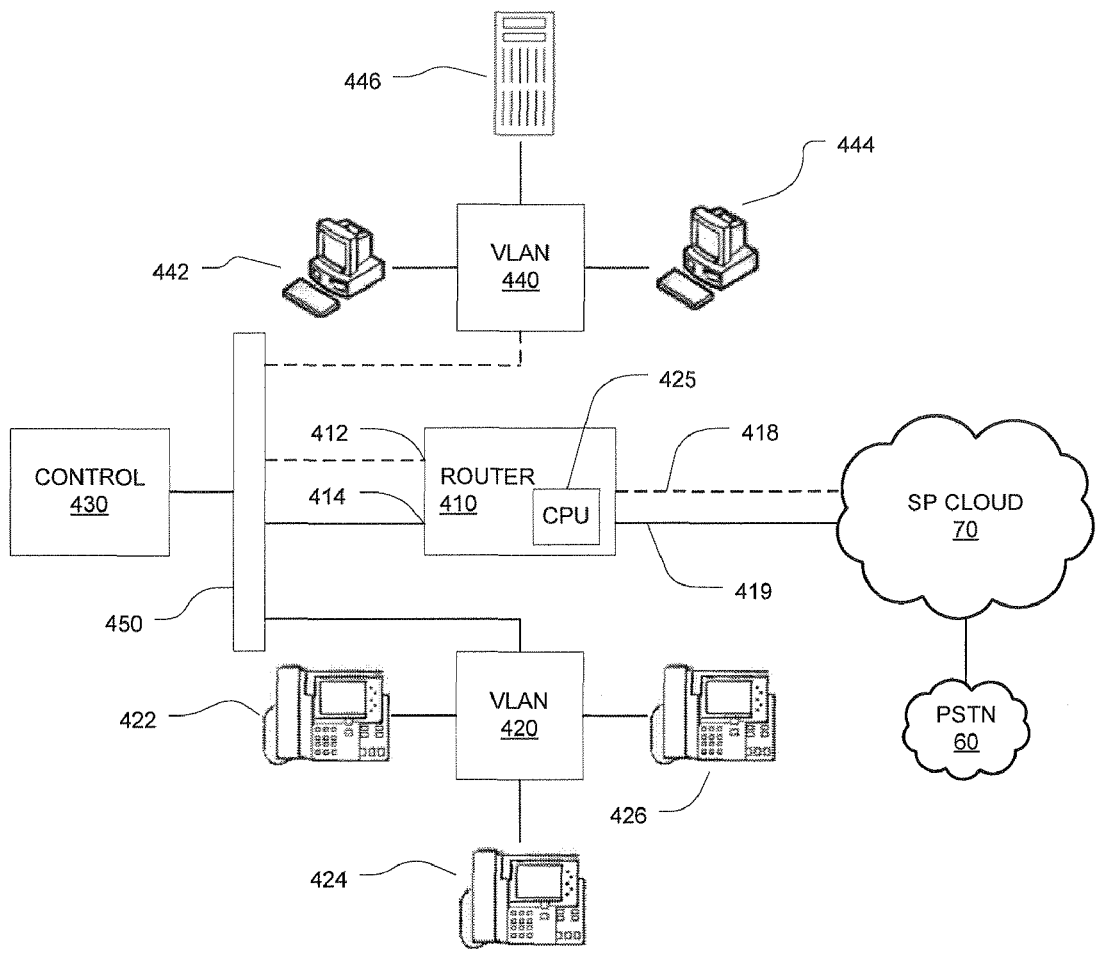
FIG. 4 illustrates an example block diagram of a networked system including a router adapted to VRF route packets.

FIG. 4 illustrates an example block diagram of a networked system including a router 410 adapted to VRF route packets received from a network device 450. The network device 450 may be a bus, or backbone connecting a VLAN 420, a VLAN 440 and a call control device 430 to the router 410. The network device 450 is shown as being connected to the router 410 at two interfaces, namely interface 412 and interface 414. The router 410 is shown as being connected to the SP cloud 70 by two VNs 418 and 419. In this embodiment, the PSTN 60 is shown connected to the SP cloud 70 rather than to the router 410.

VLAN 440 is shown connecting three endpoints, including two workstations 442 and 444 and a server 446. Data transmitted from workstations 442 and 444 or server 446 may be received by the router 410 through interface 412. VLAN 420 connects three endpoints, including digital telephone 422, digital telephone 424 and digital telephone 426. The call control device 430, or call control agent, manages communications received to and from the digital telephones 422-426. Voice data transmitted from digital telephones 422-426 may be received by the router 100 through interface 414. More or fewer connections and interfaces to router 410 may be provided, depending on the number of VLAN, types of services, and bandwidth of the connections for example. In one embodiment, all the data transmitted by the network device 450 to the router 410 are included in data packets.

Router 410 including processor 425 may receive a data packet at either of the interfaces 412 or 414. A Codec may be included in the processor 415 or may be a separate processor. The data packet received by the router 410 may be decoded and then encoded as a new data packet within the router 410 in an Internet Packet to Internet Packet (IP to IP) transaction. The new data packet is originated within the router 410 and therefore does not include the virtual network identification of the digital telephones 422, 424, or 426 or the workstations 442 or 444. Therefore, the new data packet may not be routed according to a virtual network identification. Instead processor 425 may identify a data characteristic of the decoded data, and route the data according to an identification tag 135 (FIG. 2) associated with the data characteristic. Processor 425 may also route the new data packet according to which interface 412 or 414 the original data is received on. Router 420, including process 425, may statically or dynamically VRF route the data as described with reference to router 100 in FIG. 2.

One of the VNs, such as VN 419 may be a dedicated voice VN. For example, all of the data transmitted from the digital telephones 422-426 in VLAN 420 may be routed on the VN 419. All of the data transmitted from the workstations 442 and 444 and the server 446 of VLAN 440 may be routed on the VN 418.

In one embodiment, a device allocation of the VRF selection process is done after authentication and verification after a user identify. Data traffic originating from different VRFs can get controlled access to voice and other services running on a router based on a pre-configured VRF based policy. For example, a dynamic services VRF engine is capable of identifying VRF tags for packets that originate in and are destined for the router.

Figure 5:
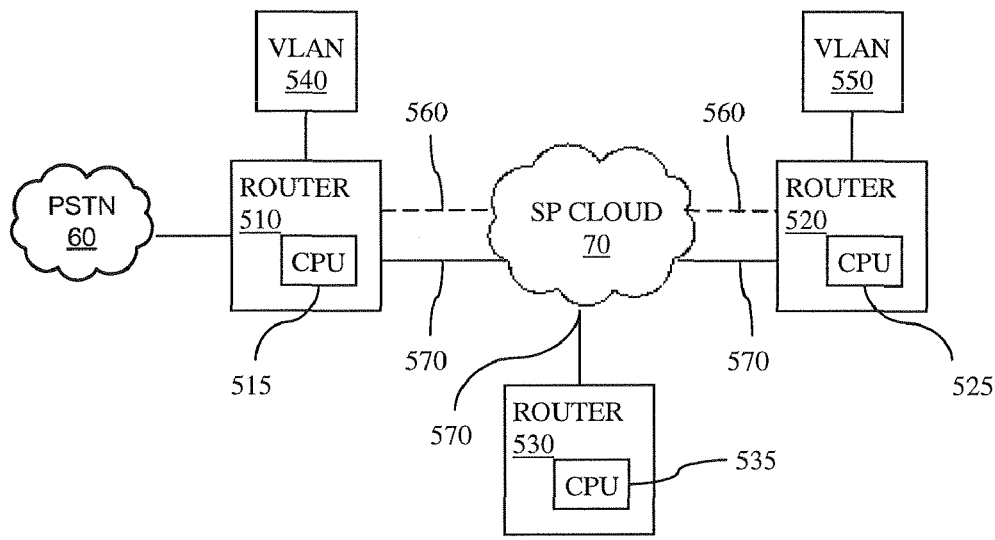
FIG. 5 illustrates an example block diagram of a networked system including multiple routers.

FIG. 5 illustrates an example block diagram of a networked system including a first router 510, a second router 520 and a third router 530. Router 510 may include a gateway function. The gateway function may be provided by processor 515 or by another processor. In one embodiment, the router 510 and router 520 include a gateway following the H.323 protocol as defined by the International Telecommunications Union Telecommunication Sector (ITU-T) version 3. Router 510 and router 520 are shown as being indirectly connected through the SP cloud 70. Router 510 is shown connected to the SP cloud 70 by two connections, including VN 560 and VN 570. Router 510 is also shown connected to the PSTN 60 and a VLAN 540. PSTN 60 is shown connected to the router 510 through multiple voice ports. Router 520 is also shown connected to the SP cloud 70 by VN 560 and VN 570. Router 530, which may include a Gate Keeper (GK) application is also shown connected to SP using VN 570. Router 530 may also have a processor 535, similar to processor 125 in FIG. 2

The router 510 including the processor 515 may route data received from the VLAN 540 or the PSTN 60 according to the methods described above with reference to FIGS. 2 and 3. Data received from VLAN 540 may be in the form of data packets and a virtual network can be identified by an ingress interface. Data received from the PSTN 60 may not include a virtual network identification, and may therefore be analyzed for a data characteristic to determine a VRF route selection. In one embodiment, voice data is routed along the VN 570, whereas other types of data packets are routed along the VN 560. Similarly, router 520 including processor 525 may route data received from VLAN 550. Voice data may be routed along the VN 570 and other types of data packets may be routed along VN 560. In one embodiment, router 530 may send and receive H.323 packets over a single voice VN.

Figure 6:
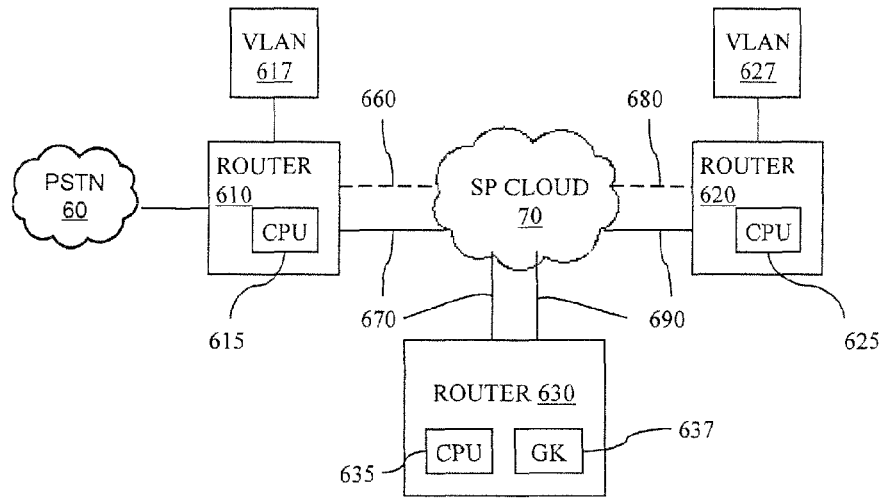
FIG. 6 illustrates an example block diagram of a networked system including multiple routers and a gatekeeper the router of FIG. 2 and multiple voice networks.

FIG. 6 illustrates an example block diagram of a networked system including a first router 610, a second router 620 and a third router 630. Router 610 and Router 620 have separate VNs on which they send voice data packets. Router 610 routes data received from VLAN 617 or PSTN 60 along VN 660 and VN 670, whereas router 620 routes data received from VLAN 627 along VN 680 and VN 690. This allows Router 610 and Router 620 to have overlapping network addresses and/or E.164 addresses and still be able to use a common Call Agent (CA) or Gate Keeper (GK).

Routers 610, 620 and 630 may include processors 615, 625 and 635 respectively, which function similarly to processor 125 in FIG. 2. Router 630 may also include an embedded GK and CA application 637. Router 630 is connected to a SP cloud 70 on both VN 670 and VN 690. Router 630 is thus able to recognize the packets coming on VN 670 to be from Router 610 and those from VN 690 to be from Router 620.

Figure 7:
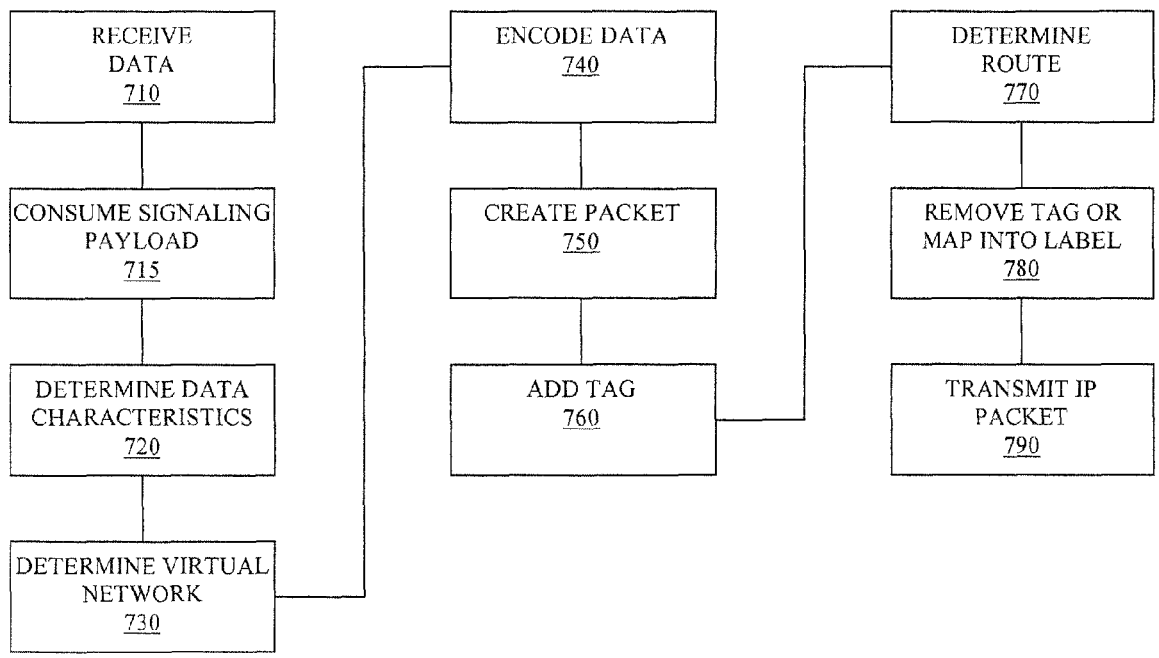
FIG. 7 illustrates an example method of VRF routing data packets that originate within a router and are transmitted on a Virtual Network.

FIG. 7 illustrates the flow of data for the packets that originate within a router, such as router 100 of FIG. 2, and are transmitted on a Virtual Network, such as VN 150 of FIG. 2.

At operation 710, data is received from an endpoint, such as endpoint 110 of FIG. 2 over an analog or digital interface directly connected to the router 100. The data, such as data 120 shown in FIG. 2 may be either analog signal (voice, fax, modem etc) or PCM encoded digital signal.

At operation 715, the signaling information is consumed by the voice applications hosted on the router 100. Data characteristics are determined at operation 720. The data characteristics may include a voice port, a destination E164 address, or a source E164 address, for example. These data characteristics are used to determine the Virtual Network of the connection as indicated by operation 730.

At operation 740, the media received by operation 710 is encoded using a negotiated codec and a voice packet is generated at operation 750.

Based on the selected VN, a tag, such as tag 135 in FIG. 2 is added to the packet at operation 760. In one embodiment, the tag 135 only has a local significance at operation 760.

At operation 770, the tag 135 is passed on to the routing process to determine the routing table to be used to route the packet.

At operation 780, the router 100 either removes or maps the tag 135 to an outbound VN Identifier based on the protocol of the transmitting interface. For example this could be an MPLS label if MPLS was being used on the outbound interface. Data with the tag 135 removed may then be processed as data packet 140 in FIG. 2.

At operation 790, the router 100 transmits the data packet 140 through a VN, such as VN 150 of FIG. 2. The VN 150 corresponds to the VRF route selection that was determined from the identification tag 135.

Figure 8:
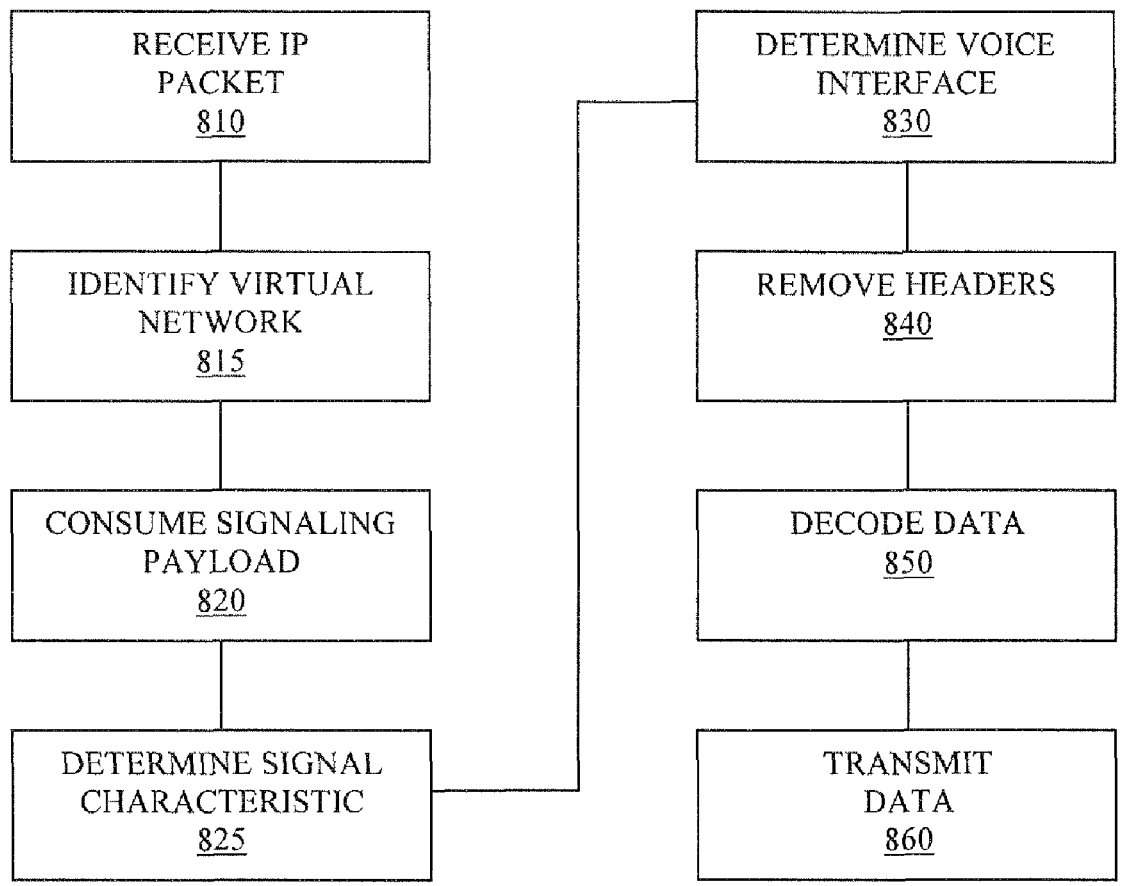
FIG. 8 illustrates an example method of VRF routing IP packets received on a Virtual Network and terminating within a router.

FIG. 8 illustrates the flow of IP packets received on a Virtual Network and terminating within the router.

An IP packet is received by router 100 at operation 810. The ingress interface is used to identify the VN of the packet at operation 815. At operation 820, the signaling packets are terminated within the router 100.

At operation 825 a signaling characteristic is determined. The signaling characteristic may include a destination or source E164 address, an H.323 identification, or a Session Initiation Protocol Uniform Resource Identifier, for example.

In one embodiment, an identification tag, similar to tag 135 of FIG. 2 is added to the data after it has been terminated at operation 820. The identification tag may be determined from the signaling characteristic.

At operation 830 the voice interface is determined. This determination may be based on the signaling characteristic. It may also be based on the Virtual Network determined by operation 815. This allows non-IP interfaces to be dedicated to a virtual network. For example, the non-IP interfaces can use voice interfaces depending on the Virtual Network of the data traffic. Voice interfaces can be dedicated to a specific Virtual Network in the event that there are multiple voice Virtual Networks. In on embodiment, the voice interface is determined according to the identification tag included with the data.

In one embodiment, the header and tag, if any, are removed at operation 840. The payload is decoded into a data format that is compatible with the voice interface at operation 850 and then transmitted on the voice interface at operation 860.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. We claim all modifications and variation coming within the spirit and scope of the following claims.

The invention claimed is:

1. An apparatus comprising:
a network device; and
a processor included in the network device and configured to:
analyze data received by the network device as a first data packet and identify a data characteristic included as part of the received data, where the data characteristic is identified independently of an ingress port on the network device, and where the received data originates from an endpoint and does not include any virtual network identification;
depacketize the first data packet, where the data characteristic is identified from data decoded from the first data packet;
generate a tag that identifies the data characteristic in response to analyzing the received data;
create an Internet Protocol (IP) packet including the tag and the received data that was analyzed, where the IP packet is created within the network device, and where the IP packet comprises the decoded data repacketized as a second data packet;
determine a forwarding identifier associated with the IP packet, where the forwarding identifier is determined according to the data characteristic identified in the tag, and where the forwarding identifier associates the IP packet with a virtual network;
translate the tag into a multi-protocol label switching (MPLS) label, where the forwarding identifier comprises the MPLS label, and where the MPLS label is included in the IP packet; and
forward the IP packet to the virtual network according to the forwarding identifier.

2. The apparatus according to claim 1 where the received data comprises non-packetized data, and where the non-packetized data originates within a public switched telephone network.

3. The apparatus according to claim 1 where the network device functions as a gateway.

4. The apparatus according to claim 1 where the data characteristic is determined as voice, video, voicemail, interactive voice response, voice extensible markup language, Internet packet to Internet packet gateway, or contact center information.

5. The apparatus according to claim 1 where the data characteristic is determined by one or more of:
a class of service, a type of service, a differentiated service code point, a source address, a destination address, a traffic type, a source voice port, a calling number, a called number, a calling Internet Protocol address, a called Internet Protocol address, a calling Uniform Resource Locator, a called Uniform Resource Locator, a call agent, or a communication protocol.

6. The apparatus according to claim 5 where the communication protocol includes:
a Session Initiation Protocol gateway, a Session Initiation Protocol Survivable Remote Site Telephony gateway, a Multiple Gateway Control Point gateway, an H.323 gateway, an Internet Packet to Internet Packet gateway, or Time Division Multiplexing.

7. The apparatus according to claim 1 where the processor is further operable to remove the tag from the IP packet prior to forwarding the IP packet.

8. The apparatus according to claim 1 where the first data packet is terminated within the network device prior to forwarding the IP packet.

9. A router configured to:

analyze a data transmission received by the router to identify a data characteristic of the data transmission, where the data transmission does not identify a source or destination associated with the data transmission;

decode data from a first data packet included in the data transmission;

identify the data characteristic from the decoded data;

determine a transmission identifier corresponding to the data characteristic, where the transmission identifier identifies a route selection;

translate the received data transmission into digital data;

encode the digital data in a second data packet that originates in the router, where the first and second data packets are included in an Internet Packet to Internet Packet transaction;

add the transmission identifier as a tag to the second data packet;

identify the route selection from the tag;

remove the tag; and transmit the second data packet through a network path corresponding to the identified route selection, where the tag is removed prior to transmitting the second data packet.

10. The router according to claim 9 where the data transmission includes an analog signal or a data stream that does not include a source identification.

11. The router according to claim 9 where the network path comprises a virtual route forwarding (VRF) path, and where the VRF path is selected from a virtual route table.

12. The router according to claim 9 where the router comprises a coder/decoder.

13. The router according to claim 9 where the router functions as a gateway.

14. The router according to claim 9 where the data transmission does not include a virtual network identification, and where the network path comprises a virtual route forwarding (VRF) path.

15. A method comprising:

receiving a data packet at a non-internet protocol interface of a network device, where the data packet does not include virtual network identification;

identifying a data characteristic included as part of the data packet, where the data characteristic is identified independently of an ingress port on the network device;

depacketizing the data packet into decoded data;

analyzing the decoded data to determine the data characteristic included in the data packet;

generating a tag that identifies the data characteristic in response to analyzing the decoded data;

determining a forwarding identifier comprising a multi-protocol label switching (MPLS) label, wherein the forwarding identifier is determined from the data characteristic identified in the tag;

repacketizing the decoded data into an Internet Protocol (IP) data packet including the MPLS label and the data, where the IP data packet is created within the network device;

determining a virtual route forwarding (VRF) path associated with the forwarding identifier; and transmitting the IP data packet from the network device to a virtual network corresponding to the VRF path, where the data IP packet is terminated within the network device prior to transmitting the IP data packet.

16. The method according to claim 15 including identifying a virtual network associated with the data according to an ingress interface, where the ingress interface is further determined according to the identified virtual network.

17. A method comprising:

receiving analog data at a non-internet protocol interface of a network device, where the analog data does not include virtual network identification;

sampling the analog data by a coder/decoder of the network device;

analyzing the analog data to determine a data characteristic included in the analog data;

translating the analog data into an interne protocol (IP) data packet;

determining a virtual route forwarding (VRF) path associated with the data characteristic where the analog data is translated into a data format compatible with the VRF path;

transmitting the IP data packet from the network device to a virtual network corresponding to the VRF path;

adding an identification tag to the IP data packet according to the data characteristic;

selecting the VRF path from a VRF table corresponding to the identification tag; and removing the identification tag prior to transmitting the IP data packet, where the identification tag is added and removed by the network device.

* * * * *

UNITED STATES PATENT AND TRADEMARK OFFICE
CERTIFICATE OF CORRECTION

| | | |
|---|---|---|
| PATENT NO. | : 7,792,097 B1 | Page 1 of 1 |
| APPLICATION NO. | : 11/552909 | |
| DATED | : September 7, 2010 | |
| INVENTOR(S) | : Michael J. Wood and Sibrina Shafique | |

It is certified that error appears in the above-identified patent and that said Letters Patent is hereby corrected as shown below:

On column 10, line 18, CLAIM 16, after "data" delete "IP".

On column 10, line 21, CLAIM 16, after "identifying" delete "a" and insert -- the --.

On column 10, line 32, CLAIM 17, after "an" delete "interne" and insert -- internet --.

On column 10, line 35, CLAIM 17, after "data" delete "characteristic" and insert -- characteristic, --.

Signed and Sealed this

Seventeenth Day of July, 2012

David J. Kappos
*Director of the United States Patent and Trademark Office*